March 1, 1949.   C. W. WALZ ET AL   2,463,447
BEET HARVESTER

Filed May 10, 1944   5 Sheets-Sheet 1

INVENTORS
CLAUDE W. WALZ, CLARENCE T.
RASMUSSEN, ROBERT D. GRIFF
BY
ATTORNEYS.

March 1, 1949.  C. W. WALZ ET AL  2,463,447
BEET HARVESTER

Filed May 10, 1944  5 Sheets-Sheet 2

*INVENTORS*
CLAUDE W. WALZ, CLARENCE
T. RASMUSSEN, ROBERT D. GRIFF
BY
*ATTORNEYS.*

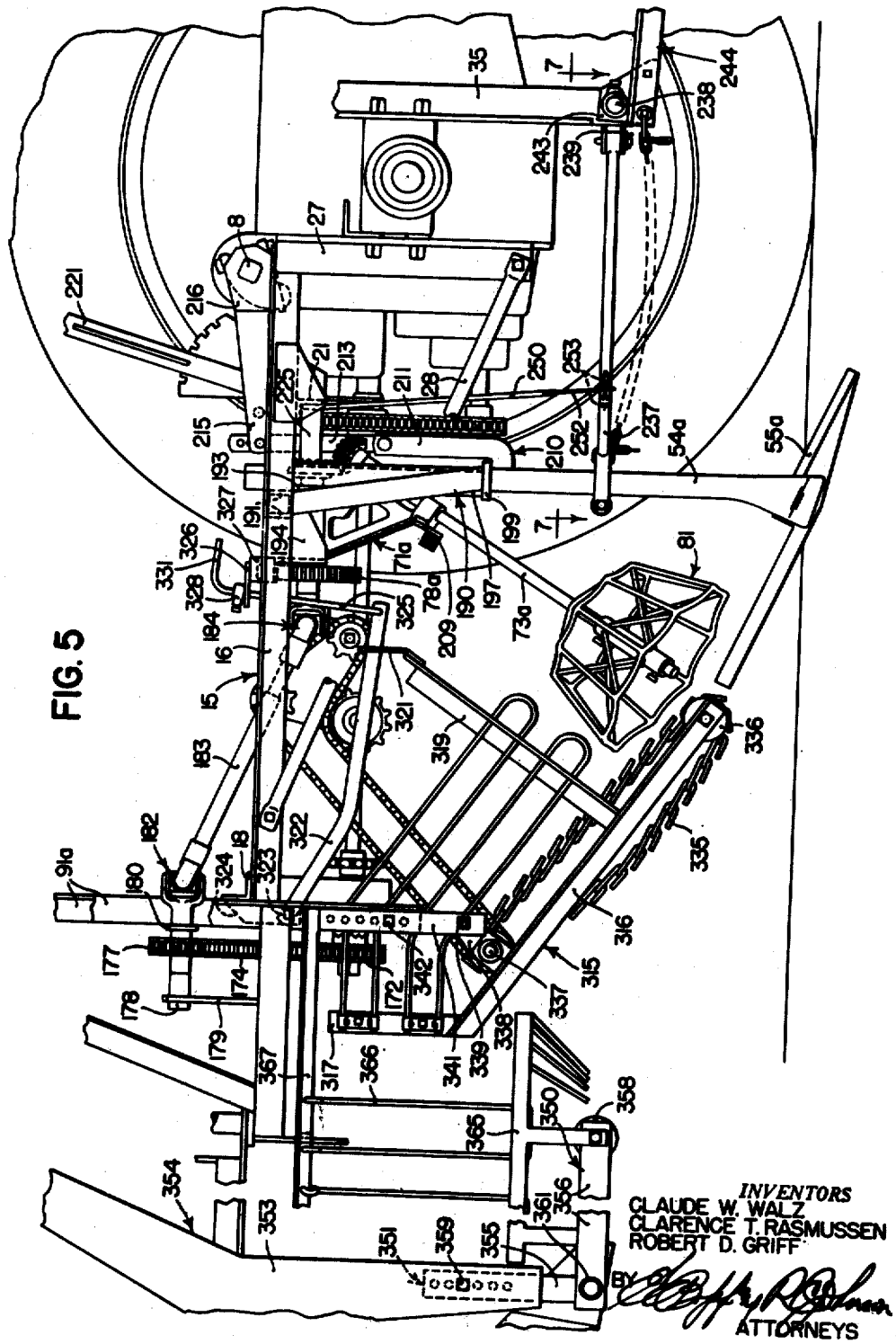

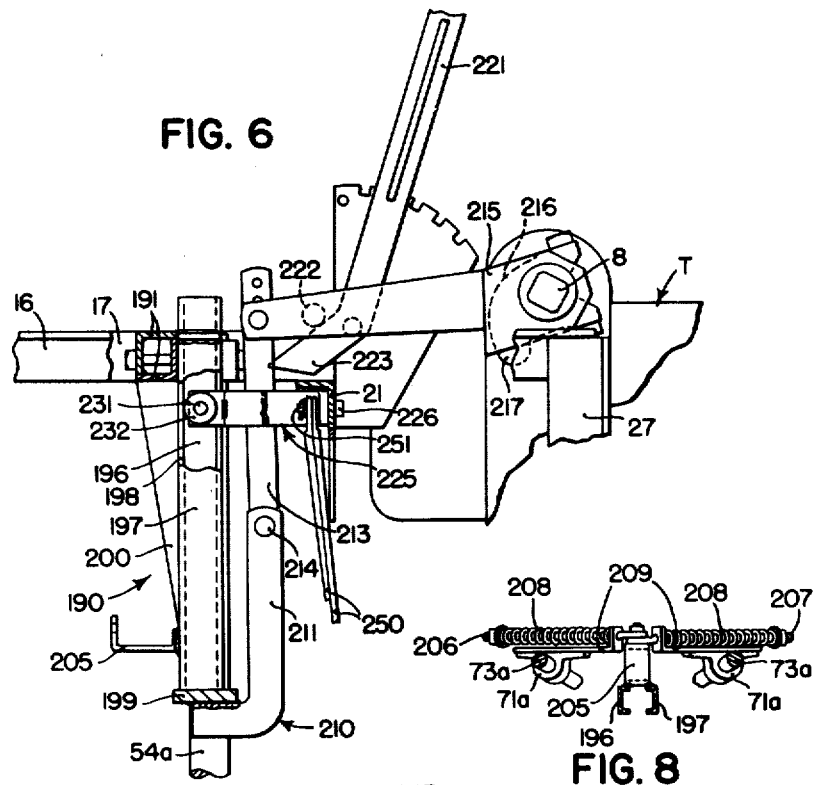
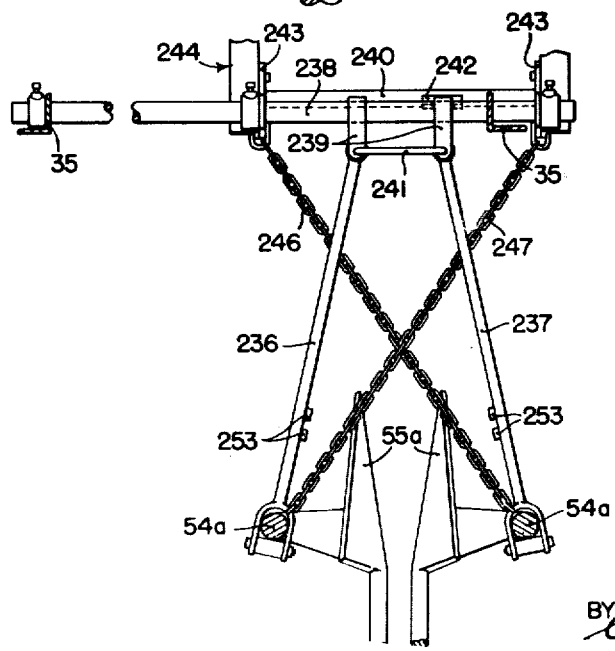
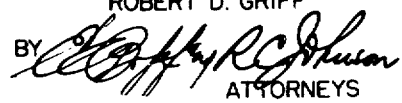

Patented Mar. 1, 1949

2,463,447

UNITED STATES PATENT OFFICE 2,463,447

BEET HARVESTER

Claude W. Walz and Robert D. Griff, Moline, Ill., and Clarence T. Rasmussen, San Jose, Calif., assignors to Deere & Company, Moline, Ill., a corporation of Illinois Application May 10, 1944, Serial No. 534,952

21 Claims. (Cl. 55—106)

This is a continuation in part of our co-pending application, Serial No. 485,526, filed May 3, 1943, which has matured into Patent No. 2,438,627, issued March 30, 1948.

The present invention relates generally to agricultural machines and more particularly to harvesters of a type adapted to harvest root crops and the like.

The object and general nature of the present invention is the provision of a new and useful beet harvester for harvesting sugar beets. More particularly, it is a feature of this invention to provide a new and improved beet lifting unit including rotatable beet engaging means disposed above and rearwardly of a pair of beet lifting plows in which the beet engaging means is made to accommodate different sizes of beets. Further, it is a feature of this invention to provide suitable draft connections between the tractor and the beet lifting unit whereby the latter may be capable of lateral movement relative to the tractor so as to accommodate more readily variations in the row spacing.

It is a further feature of this invention to provide improved driving connections between the source of power on the tractor and the rotatable elements of the beet lifting unit, which driving connections are so constructed and arranged as to accommodate the lateral movement of the lifting unit as well as the vertical movement thereof, as when lifting the same into a transport position.

These and other objects and advantages of the present invention will be apparent to those skilled in the art after a consideration of the following detailed description, taken in conjunction with the accompanying drawings in which the preferred forms of the present invention have been illustrated.

Referring to the drawings:

Figures 4 and 5 are views similar to Figures 1 and 2 but showing a modified form of the present invention.

Figure 6 is an enlarged fragmentary view taken generally along the line 6—6 of Figure 4.

Figure 7 is a view taken generally along the line 7—7 of Figure 5.

Figure 8 is a fragmentary view showing the kicker wheel biasing means.

Figure 1:
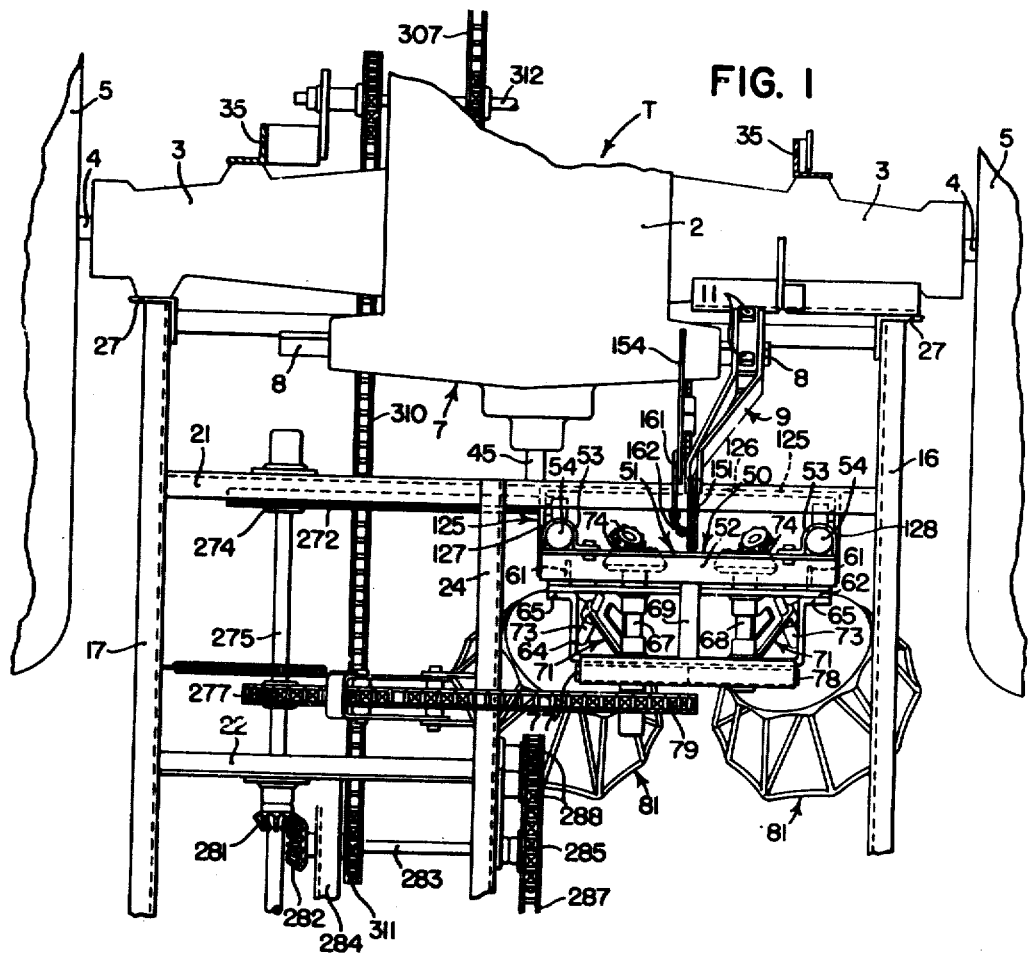
Figure 1 is a fragmentary plan view of the rear portion of a beet harvester in which the principles of the present invention have been embodied.
Figure 2:
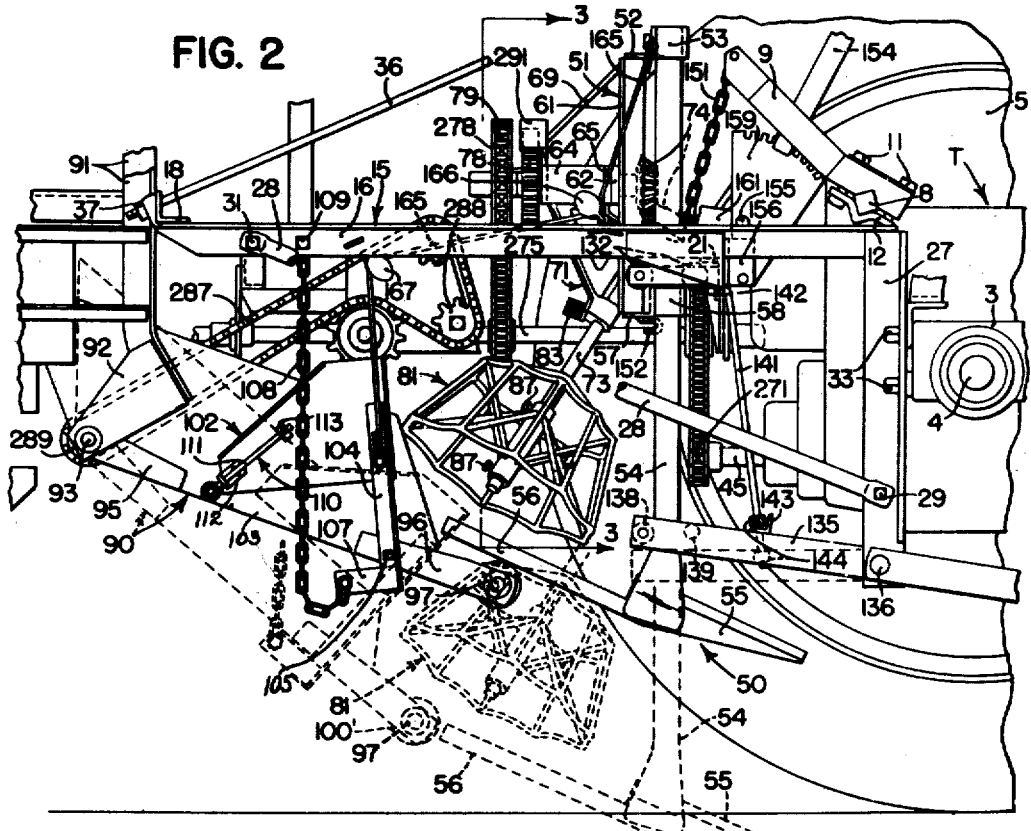
Figure 2 is an enlarged fragmentary side view of the structure shown in Figure 1, illustrating two positions of the beet lifting unit and associated parts.

Referring first to Figures 1 and 2, the tractor is indicated in its entirety by the reference character T and includes a combination frame and transmission case 2 from the rear portion of which rear axle sleeves 3 extend, receiving a pair of axle shafts 4 on which rear traction wheels 5 are fixed. The tractor T is equipped with a power lift unit, indicated in its entirety by the reference numeral 7, which comprises a rockshaft 8 on which a power lift arm 9 is fixed by any suitable means, such as clamping bolts 11 and a clamping member 12.

The rear portion of the transmission case 2 and the sleeves 3 together form a rear axle to which the parts of the beet harvester with which the present invention is particularly concerned are connected. The beet harvester comprises a supporting frame 15 which is generally rectangular in plan and which embodies right and left hand longitudinal bars 16 and 17 and a rear angle bar 18, together with suitable cross braces 21 and 22, a longitudinal frame member 24 and other parts mentioned below. As best shown in Figure 2, the frame 15 includes at its forward end generally downwardly extending bars 27, the upper ends of which are fixed to the forward ends of the frame bars 16 and 17 and the lower ends of which are connected with the rear ends of the bars 16 and 17 by suitable braces 28, the latter being bolted to the lower ends of the forward frame bars 27 and to the rear ends of the longitudinal frame bars 16 and 17, as at 29 and 31.

The frame structure 15 just described preferably is secured to the rear sides of the rear axle extensions 3 by attaching studs 33 at each side of the tractor. At the right side of the tractor, a vertical angle member 35 is secured at its lower end to the forward side of the right hand rear axle extension 3 and at its upper end receives the forward end of the downwardly and rearwardly extending brace rod 36, the rear end of which is connected at 37 to the right end of the cross bar 18. Similar bracing is provided at the left side of the tractor. Also, another bracing link is connected at its rear end to the upper end of each of the vertical angles 35 and extends downwardly and forwardly and is connected at its forward end to the tractor, preferably near the front end thereof. The tractor T is provided with a power take-off shaft 45 of conventional construction, and power is derived from the power take-off shaft 45 for driving the various parts of the beet harvester, as will be explained below.

The frame 15 adjacent its forward and downwardly extending portion carries a beet lifting unit, indicated in its entirety by the reference numeral 50, and this unit is mounted for generally vertical movement in the frame 15. The beet lifting unit 50 includes a lifting frame 51 which includes an upper angle member 52 carrying clamping means 53 which respectively receive and secure to the angle 52 the upper ends of a pair of vertically extending laterally spaced standards 54 to the lower ends of which lifting plows 55 are secured, each having a rearwardly and upwardly extending beet guiding rod or extension 56. The lifting frame 51, in addition to the upper cross angle 52, includes a lower cross angle 57 which at its ends is rigidly secured to the standards 54 by clips 58, the clips 58 being similar to the clips or clamps 53. The frame 51 also includes a pair of vertical angles 61 which at their upper ends are secured to the horizontal flange of the upper cross angle 52 and at their lower ends are secured to the lower horizontal flange of the lower cross angle 57. A cross brace 62 is disposed substantially midway of the ends of the vertical angles 61 and has its ends bolted or otherwise secured to the rear faces of the angles 61. A generally U-shaped member 64 has its ends 65 secured against the ends of the cross brace 62, the intermediate portion of the member 64 being spaced from the brace 62. The two members 62 and 64 form supports for a pair of shafts 67 and 68, the latter being secured in the members 62 and 64 by suitable bearing means. A brace 69 is secured at its upper forward end to the angle 52 and at its lower rearward end to the intermediate portion of the U-shaped bar 64.

Mounted on the two shafts 67 and 68, between the members 62 and 64, is a pair of laterally swingable journal-supporting bracket castings 71, the members 71 being swingable generally about the axes of the shafts 67 and 68, respectively. In the lower swinging end of each of the members 71 is a kicker wheel shaft 73, and each kicker wheel shaft 73 is connected to be driven from the associated drive shaft, 67 or 68, by a pair of bevel gears 74. The rear ends of the two kicker wheel drive shafts 67 and 68 respectively receive intermeshing gears 77 and 78, and a driving sprocket member 79 is mounted on the rear extended end of the laterally inner knicker wheel drive shaft 67. The means by which the sprocket 79 is driven from the power take-off shaft 45 of the tractor will be described below. A beet engaging and handling member in the form of a kicker wheel 81 is secured to the lower end of each of the kicker wheel shafts 73, the latter extending generally downwardly and laterally outwardly and rearwardly. The particular form of the beet engaging and handling members 81 is substantially the same as shown in the co-pending application, Serial No. 371,152, filed December 21, 1940, by Claude W. Walz, now United States Letters Patent No. 2,337,699, issued December 28, 1943, to which reference may be made if necessary. By virtue of the laterally swingable shaft-supporting castings 71, the kicker wheels 81 and associated parts are free to swing laterally inwardly and outwardly about the axes of their supporting shafts 67 and 68. Rod means, preferably in the form of a pair of interconnected eyebolts 83, each carrying a spring 84 and an adjusting nut 85, extend through openings formed respectively in the rearwardly turned ends of brackets that are fixed to the members 71. The springs 84 are under compression and therefore serve to yieldingly urge the beet engaging wheels 81 toward one another, the wheels however being capable of moving laterally outwardly to accommodate the passage of large beets. The beet engaging wheels 81 are disposed upwardly and to the rear of the beet lifting plows 55, and as best disclosed in the above-mentioned Walz patent, the beet engaging wheels function to grasp the beets loosened by the plows 55 and forcibly project the beets upwardly and rearwardly. The kicker wheels 81 are fixed to the shafts 73 by set screws 87 which, when loosened, permit the kicker wheels to be raised and lowered on the shafts 73 so as to adjust their position relative to the plows 55 for the purpose of accommodating excessively large or excessively small beets, as may be necessary. At their inner ends the eyebolts 83 are connected to an anchoring stud 88.

A transfer elevator, indicated in its entirety by the reference numeral 90 is pivotally connected at its rear end with the rear portion of the frame 15 and at its forward end is disposed to receive beets from the lifting unit 50. A pair of vertical angles 91 is fixed to the vertical rear flange of the angle 18 and each angle 91 at its lower end below the angle 18 extends downwardly and forwardly. A bracket 92 is fixed to each forwardly bent end of the two angles 91 and the brackets 92 are apertured to receive a pivot shaft 93. The elevator or conveyor 90 includes a pair of plates 95 apertured to receive the pivot shaft 93, by which the rear end of the transfer conveyor is supported for generally vertical swinging movement. A forward bracket 96 is fixed to the forward end of each side wall 94 and the brackets 96 are apertured to receive an idle cross shaft 97. An endless conveyor element of any suitable construction, such as or similar to a potato elevator chain, is supported by suitable sprockets or other means on the two shafts 93 and 97, as disclosed in more detail in our parent application, and the sprockets or the like on the shaft 93 serve to drive the transfer conveyor element. In normal operating position, as shown in full lines in Figure 2, the forward end of the transfer elevator 90 is disposed closely adjacent the rear of the beet lifting rods 56 and substantially underneath the kicker wheels 81.

To each of the side walls of the elevator 90 an extension shield 102 is pivoted. Each extension shield comprises a sheet 103 secured in any suitable manner to an arm 104 which is pivoted, at 105, to the associated front bracket 96. Each arm 104 is provided with an extension 107 that is connected by a chain 108 to a fixed point on the frame 15, such as a bolt 109, the latter preferably carrying a hook member by which the effective length of the chain 108 may be adjusted by engaging the chain at different points therewith. A stop member 110 is provided for each shield 102 to limit its movement in a forward direction, each stop means 110 consisting of a rod 111 pivoted to the associated side wall 94 and extending upwardly through an eye 112 carried by the shield. The upper end of the rod 111 is provided with a stop collar 113 or similar part whereby the engagement therewith of the eye 112 on the shield limits the forward swinging of the latter to substantially the position shown in dotted lines, Figure 2. Thus, in the lowered position of the transfer elevator 90, the front end thereof is supported by the chains 108, and the latter members serve to position the shields 102 generally rearwardly and above the kicker wheels 81 so as to guide beets and the like projected rearwardly by the kicker wheels 81 into the elevator 90.

Figure 3:
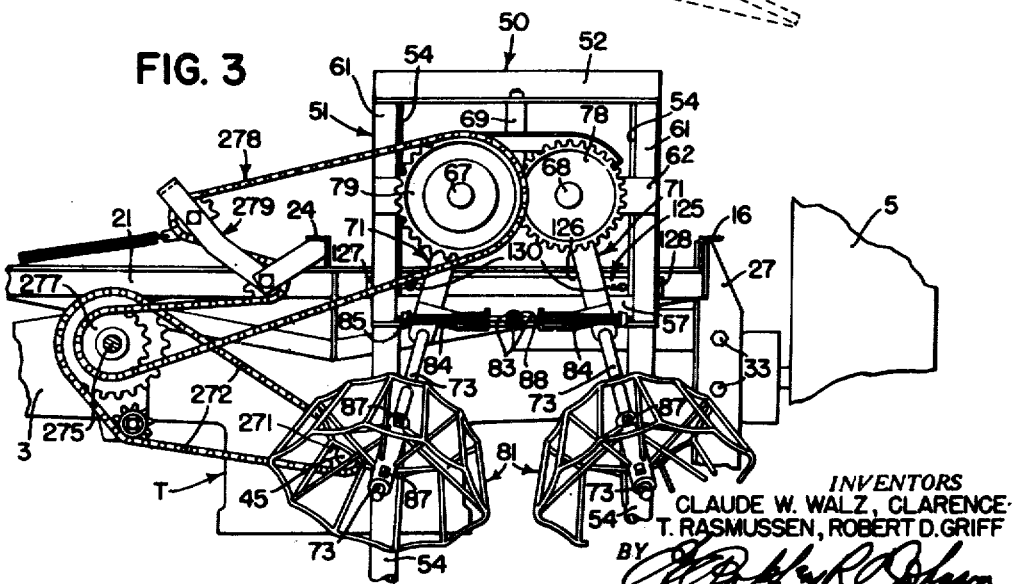
Figure 3 is a view taken generally along the line 3—3 of Figure 2.

The frame 51 of the beet lifting unit 50 is arranged for vertical movement in the frame 15. To this end, a U-shaped member 125 (Figure 1) having an intermediate portion 126 and end portions 127 and 128 is mounted for lateral adjustment on the vertical flange of the transverse cross bar 21 by any suitable means, such as bolt and slot means 130 (Figure 3). The rearwardly extending arm portions 127 and 128 of the member 125 carry rollers 132 (Figure 2) which are disposed on opposite sides of the associated lifting plow standards 54. A pair of links 135, one at each side of the beet lifter frame unit 50, are connected at their forward ends to a cross bar 136 carried at the lower ends of the two front vertical frame bars 27. A roller 138 is disposed at the rear end of each of the links 135 and a pin 139 is carried by the rear end of each link 135 in front of the associated lifting plow standards 54. In the uppermost position of the vertically shiftable lifter frame 51 (full lines, Figure 2) the lower portions of the shanks 54 engage the rear ends of the links 135 and lift them into a transport position. When the beet lifting unit is lowered into operating position (dotted lines) the links 135 remain in a generally horizontal position, as shown in dotted lines in Figure 2, being held in that position by a pair of stop rods 141 pivoted at their upper ends to lugs 142 carried by the intermediate portion 126 of the U-shaped member 125. An angle 143 connects the links 135 and is apertured to receive the lower end of the rods 141. A pair of stop collars 144 are carried in spaced apart relation on the lower end of each rod 141. The rods 141 keep the links 135 from dropping downwardly too far and are effective to hold them in a position to transmit the forward draft to the plow standards 54.

A lifting chain 151 is connected at its upper end to the power lift arm 9 and at its lower end is connected to a clip 152 fixed to the transverse angle 57 forming a part of the beet lifter frame 51. Thus, whenever the power lift of the tractor is actuated to swing the power lift arm 9 up into the lifted position, the beet lifting unit is raised into a transport position, as shown in full lines in Figure 2. For adjusting the depth of operation of the lifting plows 55 when the unit 50 is lowered into operating position (dotted lines, Figure 2), we provide a hand lever 154 pivoted at 155 to an angle or bracket 156 fixed to the forward side of the angle 21. The hand lever 154 operates along a sector 159 and has fixed thereto an arm 161 to which a chain 162 (Figure 1) is fixed at its upper end. The lower end of the chain 162 is connected with the lifter frame 51 in any suitable manner. By this means, when the power lift arm 9 is lowered, the lifting chain 151 goes slack and the weight of the lifting unit 50 is supported through the chain 162 on the adjusting lever 154, whereby movement of the latter adjusts the operating depth of the lifting plows 55 and the positions of the kicker wheels 81.

When the lifting unit 50 is raised into an inoperative position it is desirable also to raise the transfer elevator 90, and to this end a cable 165 is connected at its upper end to the vertically shiftable lifting frame 51 and is trained over a pair of pulleys 166 and 167 and at its lower end is connected to the outer pivoted shield arm 104.

As best shown in dotted lines in Figure 2, when the parts are in the lowered position, the front end of the transfer elevator 90 is supported on the chains 108 and the lifting cable 165 is slack. The pull exerted by the chains 108 holds the shields 103 in the operating position. However, when the lifting unit 50 is raised by the upward movement of the power lift arm 9, after the raising movement has progressed to a certain extent the cable 165 becomes taut, which first swings the shields 102 upwardly and rearwardly, as shown in full lines in Figure 2, out of the way of the kicker wheels 81, then continued upward movement of the lifting frame 51 exerts a pull through the cable 165 and raises the front end of the transfer elevator into its transport position. It will be noted from Figure 2 that the front end of the elevator is not raised until after the lifting plows 55 and the kicker wheels 81 have been raised through a part of their movement. This is arranged in this way in order to permit the front portion of the transfer elevator 90 to move into a position underneath the beet guiding rods 56, and as just described the action of the cable 165 is to swing the shields 102 rearwardly and out of the way of the kicker wheels.

The sprocket 79, which drives the kicker wheel shafts through the gears 74, 77 and 78, is driven from the power take-off shaft, and to this end, a driving sprocket 271 is fixed to the rear end of the power take-off shaft 45 and drives a sprocket chain 272 which extends laterally and upwardly toward the left of the tractor and at its upper end is trained over a sprocket 274 which is fixed to the forward end of a drive shaft 275. At an intermediate point on the shaft 275, a sprocket 277 is fixed and which drives a sprocket chain 278, as best shown in Figure 3. The chain 278 passes around a spring biased idler 279 and around the sprocket 79 which, as described above, is fixed to the rear extended end of the kicker wheel drive shaft 67. Rearwardly of the sprocket 277 is a bevel gear 281 which meshes with and drives a companion bevel gear 282 fixed to the left end of a transverse shaft 283 journaled for rotation in suitable bearing brackets supported by the frame bar 24 and an auxiliary frame bar 284 (Figure 3). As best shown in Figure 1, a sprocket 285 is fixed to the right end of the cross shaft 283 and receives a driving chain 287 which passes over a pair of idler gears 288 journaled on the frame 15 and also over a rear sprocket 289 which is fixed to the upper shaft 93 of the transfer elevator 90. A shield 291 (Figure 2) covers the two gears 77 and 78 that drive the kicker wheels 81. A topping unit (not shown) on the front of the tractor is driven by a sprocket chain 310 which at its rear end is trained around a sprocket 311 that is fixed to the transverse shaft 283. The forward portion of the chain 310 is trained over a sprocket fixed to a cross shaft 312 supported by suitable brackets forward of the rear axle of the tractor.

Figure 4:
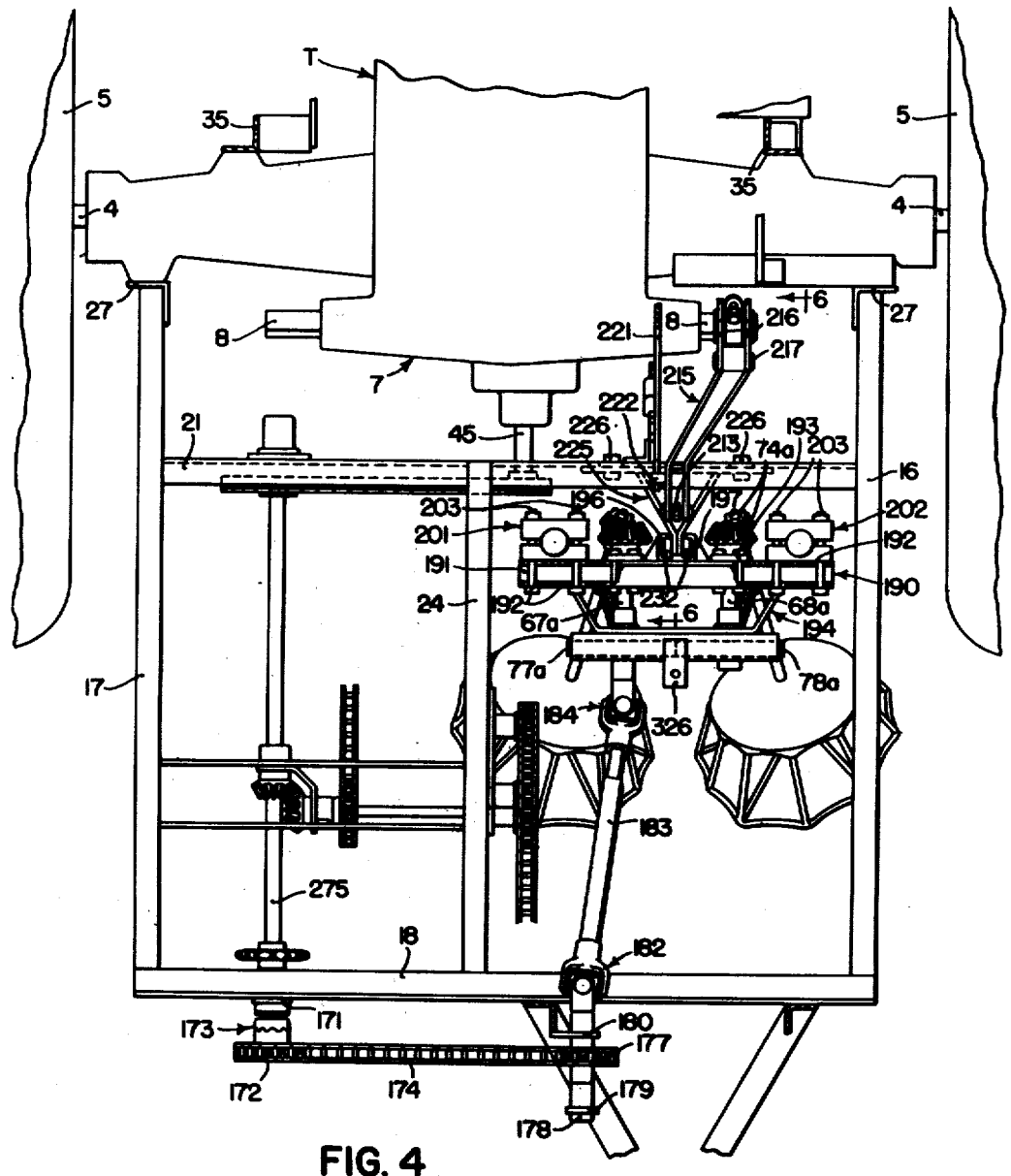

Referring now to Figures 4 et seq., wherein a modified form of kicker wheel unit, especially constructed to provide for relatively free lateral movement thereof with respect to the tractor is provided for, the rear frame is the same as described above and hence the same reference numerals will be used, the same being true of other parts which are substantially identical to the parts previously described. In this form of the invention a bracket 171 is fixed at its upper end to the rear face of the rear cross bar 18 and is apertured and receives suitable bearing means in which the rear end of the drive shaft 275 is journaled. The kicker wheel drive in this form of the invention is somewhat different from the kicker wheel drive shown in Figures 1-3, in order to accommodate the above-mentioned relatively free lateral swinging of the kicker wheel unit. The kicker wheel drive comprises a sprocket 172 connected, preferably through slip clutch means 173, with the rear end of the drive shaft 275. A sprocket chain 174 is trained around the sprocket 172 and extends laterally upwardly and inwardly, passing over an idler 176 and around a sprocket 177 fixed to a relatively short shaft 178. The latter shaft is journaled for rotation and supported on the frame 15 by a pair of brackets 179 and 180. The forward end of the shaft 178 is connected by a universal joint 182 with a telescopic shaft section 183, the forward end of which is connected by a second universal joint 184 directly to the rear end of the kicker wheel shaft 67a.

The kicker frame, indicated in its entirety by the reference numeral 190, is slightly different from the kicker frame described above. In this form of the invention the kicker wheel frame comprises an upper transverse member in the form of a pair of upper angles 191 welded together, each having a pair of slots 192 adjacent each end. A pair of apertured brackets 193 are fixed as by welding or the like to the lower angle 191, and cooperating with the brackets 193 is a rearwardly disposed gear support 194 comprising a generally U-shaped member having its forwardly extending ends secured as by welding to the end portions of the lower angle 191, preferably underneath the lower horizontal flange thereof. The kicker wheel drive shafts 67a and 68a are rotatably supported by suitable bearings in the brackets 193 and the bracket support 194. Gears 77a and 78a are fixed to the rear ends, respectively, of the kicker wheel drive shafts 67a and 68a, and since the forward universal joint 184 is fixed to the rear end of the drive shaft 67a, by virtue of the gears 77a and 78a, both of the kicker wheel drive shafts are driven from the drive shaft 275.

The kicker wheel frame also includes a pair of channels 196 and 197 disposed in a generally vertical position with their flanges facing one another and spaced apart so as to provide a vertical slot 198 therebetween. At their upper ends the channels 196 and 197 are secured as by welding to the central portion of the lower transverse angle 191 and at their lower ends the channels are secured as by welding to a lower transverse member in the form of a beam guide bar 199 apertured at its ends. A pair of braces 200 connect the ends of the bar 199 to the flange of the lower angle 191 at the ends of the latter. A pair of kicker wheel shafts 73a are journaled for rotation in brackets 71a that are swingably mounted on the central portions of the kicker wheel drive shafts 67a and 68a, and bevel gears 74a connect the downwardly extending kicker wheel shafts with the longitudinally extending kicker wheel drive shafts.

The lift points 55a are fixed to generally vertically extending beams 54a which extend upwardly through the apertures in the beam guide bar 199. At their upper ends the shanks 54a are received between clamping members 201 and 202 which, by means of bolts extending through the slots 192 in the angle 191, serve to secure the clamps to the angle 191. The upper ends of the shanks or beams 54a where they are received by the clamps 201, 202 are round. The shanks 54a are loosely received by the lower guide bar 199, and by loosening the clamping bolts 203, the shanks 54 may be adjusted upwardly or downwardly, or they may be rotated to bring the forward ends of the points closer together or farther apart, or the clamps 201, 202 may be shifted relative to the slots 192 thus spreading the points 55a bodily farther apart or closer together. A clip 205 is welded to the channels 196 and 197 and receives eyebolts 206 and 207 that carry springs 208. The springs 208 bear against arms 209 that are fastened to the laterally swingable members 71a for urging them to swing toward one another. Kicker wheels 81 are carried at the lower ends of the kicker wheel shafts 73a. section 211 is fixed rigidly to the central portion of the lower bar 199 of the kicker wheel frame, and a link 213 is pivoted at its lower end, as at 214, to the bracket section 211 and at its upper end to a rearwardly extending arm 215 connected in any suitable manner to the power lift shaft 8 of the tractor T. The bracket extension 211 is of such length that the pivot point 214 lies above the c. g. of the vertically shiftable kicker wheel unit. The power lift arm 215 is floatingly connected with the power lift shaft 8 by virtue of being pivoted to the latter through a short arm 216 that is fixed to the latter but is provided with a pair of lugs 217 which engage underneath a portion of the arm 215. By virtue of this construction, raising movement of the short arm 216 acts through the arm 215 to raise the kicker wheel unit, but in the lowering direction the arm 215 need not follow the short arm 216. In order to adjust the vertical position of the kicker wheel frame, and thereby adjust the normal depth of operation of the lifting points, a depth adjusting lever 221 is pivotally mounted on the front angle 21 and has an arm 223 that is adapted to be engaged by a pin 222 carried on the rear end of the arm 215. Thus, by changing the position of the adjusting lever 221, the arm 215 may be stopped in different positions relative to the main frame 15.

The upper portion of the kicker wheel frame is connected to the frame 15 by means of a bracket 225 that is bolted, as at 226, to the front angle 21 of the main frame, preferably the bolts 226 passing through the slots through which the bolts 130 in Figure 3 extend. The bracket 225 at its rear end carries a pivot 231 on which a pair of rollers 232 are journaled. The rollers are received within the slot 198 formed by the opposed channels 196 and 197. The kicker wheel frame may move upwardly or downwardly relative to the rollers 232 on the bracket 235 and also the kicker wheel frame may swing generally laterally about the rollers as a form of pivotal support.

The lower end of the kicker wheel frame is stabilized by a pair of draft links 236 and 237 which at their rear ends are pivotally and slidably connected with the lower ends of the lift shanks 54a and at their forward ends are connected with a transverse bar 238 by a pair of pivot yokes 239. The pivot yokes 239 are linked together, as at 241, and are held against lateral shifting on the bar 238 by a notched lug 242 welded to a cross bar 240 fixed at its opposite ends to the brackets 243 that form a part of the topping unit push frame 244. The bar 238 is supported at the lower ends of vertical frame angles 35. The forward connections of the links 236 and 237 provide for lateral swinging of the links relative to the tractor, and there is sufficient looseness to accommodate the kicker wheel unit, including the beams 54a, swinging laterally an appreciable distances in each direction from a central position, generally about the draft connection 225, 232 as a center. A pair of crossed links 246 and 247 connect the draft links 236 and 237 so as to limit the lateral swinging of the kicker wheel unit. Where the chains 246 and 247 are slack the lateral swinging of the kicker wheel unit is free so that as the outfit travels down a row of beets, any irregularities of the beets in the row are readily accommodated, but in certain conditions, as where the ground is hard, the chains 246 and 247 may be arranged substantially taut so as to hold the pullers 55a against lateral swinging. In order to keep the rear ends of the draft links 236 and 237 from dropping down too far along the lower ends of the shanks 54a, we provide a pair of generally upwardly extending links 250 on each of which is formed an eye at its upper end, each eye being apertured and pivoted on a pin 251 carried by the draft bracket 225 and in generally longitudinal alignment with the roller unit 231, 232 so that the relation between the upper ends of the links 250 and the axis of lateral swinging of the kicker wheel unit is not varied. At the lower end, each of the links 250 carries an elongated U-shaped rod 252 welded to the lower end of the link and encircling the associated draft link, 236 or 237. Each of the draft links is provided with a pair of lugs 253 so as to keep the lower end of each link from shifting fore or aft along the associated draft link. The U-shaped rod members 252 thus provide slots in which the rear ends of the draft links 236 and 237 are disposed, the lower end of such slots limiting the downward movement of the draft links, and the upper end of such slots serve to limit the upward swinging of the links 236 and 237 relative to the kicker wheel unit. It will be remembered that the bracket 225 is carried by the main frame 15 and not by the kicker wheel frame. The links 250 serve about the same purpose as the links 141 described above in connection with Figure 2.

A transfer elevator unit, indicated in its entirety by the reference numeral 315, is, according to the present invention, mounted for vertical adjustment on the main frame 15. The transfer elevator unit 315 comprises a downwardly and forwardly extending frame including angles 316 extending to a point adjacent the rear portions of the pullers 55a and upper angle extensions 317 that preferably are welded or otherwise firmly fixed to the upper ends of the angles 316. A yoke angle 319 is fixed at its lower ends, as by welding or the like, to the angles 316. A slotted clip 321 is fixed to the intermediate portion of the yoke angle 319 and a lifting bar 322 is extended through the slot in the clip 321. The rear end of the lifting bar 322, which is disposed generally centrally above the transfer elevator unit 315, is pivotally connected, as at 323, at its rear end to a bracket 324 carried by the rear frame angle 18 of the main frame 15. The front end of the lifting bar 322 is connected by a link 325 to a bracket 326 carried by a cover 327 for the kicker wheel drive gears 77a and 78a. A collar 328 is adjustably fixed to the upper end of the link 325, and by fixing the collar 328 to the link 325 in different positions the vertical position of the front end of the transfer elevator 315 may be adjusted. The upper end of the link 325 is formed as a handle 331 to facilitate raising the front end of the transfer elevator whenever desired, as when readjusting the position of the collar 328. The transfer elevator 315 includes a more or less conventional endless element 335 trained over rollers 336 at the front end and sprockets at the rear end of the element 335, the sprockets being fixed to a drive shaft 337 carried by the frame bars 316. By means of a pair of brackets 338 the transfer elevator unit 315 is pivoted for generally vertical swinging movement, as at 339, to the lower end of a pair of bars 341 disposed generally vertically and serving as downwardly depending main frame extensions which are adapted to be fixed in different positions of adjustment to the lower ends of the angles 91a. Either the bars 341 or the angles 91a, or both, are provided with a plurality of openings to receive fastening bolts 342 or the like whereby the position of the transfer elevator 315 may be adjusted vertically on the main frame 15. The transfer elevator unit 315 includes side rods carried by the yoke angle 319 and the rear upper frame angles 317.

The purpose in having the transfer elevator 315 vertically adjustable is to accommodate the position of the same when the harvester is attached to tractors having different size tires. That is, with the larger diameter tires the tractor may stand up higher with respect to the ground level than in other cases, but in all cases it is desirable to have the front end of the transfer elevator 315 as close to the ground as possible and at as small an angle as possible with respect to the horizontal. In view of the vertical adjustment of the transfer elevator 315, it is also desirable to vertically adjust the position of the beet elevator into which the transfer elevator 315 is adapted to deliver the beets projected over from the pullers by the kicker wheels 81. As best shown in Figure 5, the elevator hopper is indicated by the reference numeral 350 and comprises a supporting structure in the nature of a pair of arms 351 which are carried adjustably by the lower ends of a pair of vertically disposed members 353 that form a part of the main elevator support yoke 354. Preferably, each arm includes a vertical section 355 and a horizontal section 356 suitably welded or otherwise rigidly fixed one to the other. The forward ends of the horizontal arm sections 356 carry rollers 358 on which the main elevator conveyor is mounted, and the vertical sections 355 are provided with a plurality of apertures to receive one or more supporting bolts 359 which secure the arms to the lower ends of the members 353 in different positions of adjustment. The arms 351 are apertured to receive a pivot pipe 361 to which the lower end of the main elevator is connected. The hopper 350 also includes a forwardly extending arcuate band 365 which is fastened rigidly to the horizontal arm sections 356 and serves to confine the outwardly swingable elements 366 that are pivoted to an arcuate yoke 367. The yoke 367 is adapted to be fixed to the lower portions of the vertical frame bars 91a in different positions of adjustment so as to dispose the lower ends of the swinging bars 366 in the correct relation with respect to the lower confining band 365 which, being carried by the arms 351 and forming a part of the main elevator hopper structure 350, are adjusted vertically when the arms 351 are adjusted vertically.

In the form of the invention just described, the operation of the tractor power lift, when it is desired to raise the pullers 55a, results also in raising the front end of the transfer elevator 315 through the lifting link 325 and the associated lifting bar 322. The slotted clip 321 is disposed more closely adjacent the lifting link 325 when the elevator is in its lowered position than when it is in its raised position, since the clip 321 slides along the lifting bar 322 as the latter is raised. This particular arrangement results in preventing the lower end of the transfer elevator 315 from colliding with the kicker wheels 81. When it is desired to place the machine in operation, the tractor power lift is lowered but the lowered position of the pullers 55a depends upon the setting of the depth adjusting hand lever 221. Likewise the position of the front end of the transfer elevator 315 is adjusted. The kicker wheel frame unit 190 may swing laterally as well as move up and down, generally about the rollers 232 as an axis, depending upon the amount of slack placed in the chains 246 and 247. It is generally preferable to arrange the kicker wheel unit so that it can shift laterally with respect to the tractor and thus follow the beets in the row. The front end of the transfer elevator 315 is of sufficient width to receive the beets projected rearwardly by the kicker wheels 81 even though the kicker wheel unit may shift laterally at its lower end with respect to the tractor in order to follow the row. By virtue of the two universal joints 182 and 184 and the telescopic shaft 183, the drive is transmitted to the kicker wheel shafts without interference by the lateral swinging of the kicker wheel unit. Raising and lowering the elevator hopper 350 and the transfer elevator 315 permits the owner to adjust these parts to the particular tractor on which the implement is carried.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. A beet lifting device for beet harvesters and the like, comprising a frame, said frame including a generally transverse upper section and a generally transverse lower section, a pair of beet lifting members, each including a generally upwardly extending shank, a pair of shank-engaging clamps carried by said upper transverse section, means on the lower transverse section shiftably receiving said shanks, and beet handling means carried by said frame generally rearwardly and upwardly of the lower portions of said beet lifting members.

2. In a beet harvester including a pair of beet lifting members, a kicker wheel unit comprising a frame, a pair of kicker wheels mounted thereon and disposed generally rearwardly of said beet lifting members, and means connecting said frame with said beet harvester comprising a part carried by the harvester and part-receiving means on the kicker wheel frame swingably receiving said part and thereby providing for generally lateral swinging movement of said kicker wheel unit relative to said beet harvester.

3. In a beet harvester, a beet lifting and handling unit comprising a frame, a pair of lifting plows carried thereby, a pair of rotatable kicker wheels also carried by said frame and disposed generally rearwardly of said lifting plows, supporting means carried by said harvester, and means on said unit engageable with said supporting means on the harvester for connecting said frame with the part on said beet harvester for generally lateral swingable movement.

4. In a beet harvester, a beet lifting and handling unit comprising a frame, a pair of lifting plows carried thereby, a pair of rotatable kicker wheels also carried by said frame and disposed generally rearwardly of said lifting plows, a part carried by said harvester, and means on said unit frame for swingably connecting said frame with the part on said beet harvester for both vertical movement and laterally swingable movement relative thereto.

5. In a beet harvester, a beet lifting and handling unit comprising a frame, a pair of lifting plows carried thereby, a pair of rotatable kicker wheels also carried by said frame and disposed generally rearwardly of said lifting plows, a draft connection carried by said harvester in substantially fixed relation, and means on said frame for receiving said draft connection and accommodating both vertical movement and lateral swinging movement of the frame relative to the harvester.

6. In a beet harvester, a beet lifting and handling unit comprising a frame, a pair of lifting plows carried thereby, a pair of rotatable kicker wheels also carried by said frame and disposed generally rearwardly of said lifting plows, a draft connection carried by said harvester in substantially fixed relation, and means connecting said draft connection with said frame for accommodating both vertical movement and lateral swinging movement of the frame relative to the harvester, said last mentioned connecting means including a pair of opposed channels carried by said frame, a pair of axially aligned rollers carried by said fixed draft connection and disposed within said channels.

7. A tractor mounted beet harvester comprising a beet lifter frame, means comprising a pair of relatively movable interconnected parts, one on the tractor and one on said frame, for connecting the latter with the tractor for lateral movement relative thereto, plow means carried by said frame for lifting beets out of the ground, a pair of generally downwardly and rearwardly disposed shafts, rotatable beet engaging elements carried by the lower ends of said shafts rearwardly of said plow means so as to receive beets therefrom, means swingably supporting said shafts on said beet lifter frame for generally lateral movement so that said rotatable beet engaging elements may move relative to said frame toward and away from each other, and spring means for urging said elements toward each other to engage beets and propel them rearwardly therefrom.

8. A beet lifting device for beet harvesters, comprising a pair of generally longitudinally extending laterally spaced apart driving shafts, frame means therefor, a pair of interconnected relatively movable parts, one shiftable laterally relative to the other, means connecting one of said parts to the harvester, means connecting the other of said parts to said frame means, shaft-supporting journals swingably mounted on said driving shafts, a driven shaft carried by each of said journals in depending relation, beet lifting means carried by the lower ends of said driven shafts and shiftable relative to said frame means toward and away from each other by lateral swinging of said journals on said driving shafts, and means for driving the driven shafts from the driving shafts.

9. A beet lifting device for beet harvesters, comprising plow means for lifting beets out of the ground, a generally vertically shiftable frame to which said plow means is connected to be raised and lowered into and out of transport and working positions, a pair of interconnected relatively movable parts, one shiftable laterally relative to the other, means connecting the other of said parts to said frame, a pair of generally longitudinally extending laterally spaced apart driving shafts carried by said frame, shaft-supporting journals swingably mounted on said driving shafts, a driven shaft carried by each of said journals in depending relation, beet lifting means carried by the lower ends of said driven shafts and shiftable toward and away from each other by lateral swinging of said journals on said driving shafts, means for driving the driven shafts from the driving shafts, and means for raising and lowering said frame so as to raise and lower both said plow means and said beet engaging elements.

10. In a beet harvester, means serving as a generally longitudinally extending main support adapted to pass down a row of beets, an attachment frame adapted to be fixed to the rear portion of said main frame, a beet lifting and handling unit swingably connected with and disposed generally adjacent the forward portion of said attachment frame and including elements adapted to engage and propel beets generally rearwardly, a power take-off shaft on said main support and means for driving said elements including a longitudinally extending shaft supported on said attachment frame and operatively connected at its front end with a source of power, shaft means supported at its rear end on the rear portion of said attachment frame and at its forward end on said swingable unit and including universal joints accommodating the relative movement between the unit and the attachment frame, and means operatively connecting the rear portion of said longitudinal shaft with the rear end portion of said shaft means.

11. In a tractor mounted beet harvester, frame means, means for fixedly securing said frame means to the rear end of the tractor, a laterally swingable beet lifting and handling unit connected with the rear of the tractor in draft-receiving relationship and including parts to be driven, means on said frame means for movably receiving said unit, and a telescopic shaft unit including a first section carried by said unit, a second section carried by the rear portion of said frame means, means including universal joint means connecting said sections so as to transmit the drive to said parts while accommodating relative movement between said unit and said tractor carried frame means, and means for driving said second shaft section from the power take-off shaft of the tractor.

12. In a tractor mounted beet harvester adapted to be mounted on a tractor having a power take-off shaft, a main frame adapted to be fixed to the tractor, a beet lifting and handling unit comprising a unit frame, means connecting the unit frame with the main frame for generally lateral movement relative thereto, generally longitudinally disposed shaft means carried by said unit frame and rotatable beet engaging means driven from said shaft means, and a driving connection between said shaft means and the tractor power take-off shaft including telescopic shaft and universal joint means extending between said power take-off shaft and said longitudinal shaft means and accommodating movement thereof relative to the main frame incident to the lateral movement of said beet lifting unit.

13. In beet lifting apparatus, frame means having upper and lower portions, the lower portion including a part having a pair of laterally spaced openings, a pair of beet lifting plows having shanks extending upwardly, respectively, through said openings and carrying beet lifting means at their lower ends below said lower frame portion, and laterally shiftable and adjustable clamping means carried by said upper frame portion and shiftable relative thereto for connecting the upper ends of said shanks with the upper frame portion, said clamping means accommodating both vertical movement and rotary movement of said shanks relative thereto into different positions of adjustment, lateral shifting of said clamping means relative to said upper frame means serving to carry said beet lifting means at the lower ends of said shanks toward or away from one another.

14. In a tractor mounted beet harvester adapted to be mounted on a tractor having a power lift unit of the type having a stop-engaging portion, means serving as a main frame mounted on the tractor, a generally vertically movable lifting unit carried by said main frame and movable vertically relative thereto, a lifting connection between said lifting unit and said power lift, and means for limiting the downward movement of said lifting unit relative to said main frame, including a hand lever mounted on said main frame and a generally vertically adjustable stop operated by the hand lever and adapted to be engaged by said portion of the power lift so as to act through said lifting connection for limiting the downward movement of the beet lifting unit.

15. In a tractor mounted beet harvester attachment, adapted to be mounted on a tractor having a power lift arm swingable generally vertically at one side of the tractor, a supporting frame adapted to be rigidly fixed to the rear portion of said tractor, a vertically shiftable beet lifter frame carried by said supporting frame for generally vertical movement relative thereto and generally at the side of said supporting frame underneath said power lift arm, a connection from the latter to said beet lifter frame for raising and lowering the latter, and means for guiding said vertically shiftable beet lifter frame during its vertical shifting movements.

16. In a tractor mounted beet harvester attachment, adapted to be mounted on a tractor having a power lift arm swingable generally vertically at one side of the tractor, a supporting frame adapted to be rigidly fixed to the rear portion of said tractor, a vertically shiftable beet lifter frame carried by said main frame for generally vertical movement relative thereto and generally at the side of said supporting frame underneath said power lift arm, a connection from the latter to said beet lifter frame for raising and lowering the latter, guide means carried by said main frame, and cooperating means on said beet lifter frame movable in said guide means by the operation of said power lift arm.

17. In a tractor mounted beet harvester, a main frame adapted to be rigidly secured to the rear portion of said tractor, a generally rearwardly extending bracket connected to said main frame adjacent the forward portion thereof, a beet lifting unit including a generally vertically movable frame, cooperating guide means on the vertically movable frame engaging opposite side portions of said generally rearwardly extending bracket, said bracket and guide means being constructed and arranged to accommodate limited lateral swinging of said vertically movable frame relative to the main frame, means carried adjacent the rear portion of said main frame to receive beets from said unit in any lateral position thereof, and means for raising and lowering said vertically shiftable frame relative to said main frame.

18. In a tractor mounted beet harvester, a main frame adapted to be rigidly secured to the rear portion of said tractor, a generally rearwardly extending bracket connected to said main frame, a beet lifting unit including a generally vertically movable frame, cooperating guide means on the vertically movable frame engaging opposite side portions of said generally rearwardly extending bracket, and means on said main frame for raising and lowering said vertically shiftable frame, said bracket and cooperating guide means being disposed generally centrally in a lateral direction of said beet lifting unit.

19. In a tractor mounted beet harvester, a supporting frame, means for fixing said supporting frame to the rear of said tractor, a vertically shiftable beet lifting unit movably carried at the forward portion of said supporting frame, a vertically swingable transfer elevator disposed rearwardly of said lifting unit and adapted to receive beets therefrom, means pivotally supporting the rear portion of said transfer elevator on the rear portion of said supporting frame, and means for raising and lowering the front portion of said transfer elevator from said supporting frame relative to said vertically shiftable beet lifting unit.

20. In a beet harvester including a mobile supporting frame, an attachment frame, means for fixing said attachment frame to said supporting frame, a sub-frame, beet lifting plow means carried by the lower portion of said sub-frame, means connecting said sub-frame with said attachment frame for generally lateral and vertical shifting movement, comprising a pair of parts, one fixed to said sub-frame and the other fixed to said attachment frame, said parts including interengaging means accommodating both vertical movement and lateral movement of the sub-frame relative to said attachment frame, and means for raising and lowering the sub-frame relative to the attachment frame.

21. The invention set forth in claim 20, further characterized by a power driven connection on the rear portion of said attachment frame, rotatable beet engaging means mounted on said sub-frame and shiftable laterally and vertically therewith relative to said attachment frame, and a flexible driving connection extending from said power driven connection on the rear of the attachment frame forwardly to said rotatable beet engaging means.

CLAUDE W. WALZ.
ROBERT D. GRIFF.
CLARENCE T. RASMUSSEN.

REFERENCES CITED

The following references are of record in the file of this patent:

UNITED STATES PATENTS

| Number | Name | Date |
| --- | --- | --- |
| 627,209 | Schmidt | June 20, 1899 |
| 1,140,202 | Smith | May 18, 1915 |
| 1,668,157 | Kopitke | May 1, 1928 |
| 1,714,889 | Raoult | May 28, 1929 |
| 1,721,122 | Johnson | July 16, 1929 |
| 2,062,711 | Hansen | Dec. 1, 1936 |
| 2,072,186 | Sishc | Mar. 2, 1937 |
| 2,174,310 | Tuft | Sept. 26, 1939 |
| 2,185,350 | Michael | Jan. 2, 1940 |
| 2,256,563 | Kamplade | Sept. 23, 1941 |

FOREIGN PATENTS

| Number | Country | Date |
| --- | --- | --- |
| 22,314 | Denmark | July 30, 1917 |
| 120,053 | France | Aug. 27, 1877 |
| 225,738 | Great Britain | 1924 |